(12) United States Patent
Yamamura

(10) Patent No.: US 8,000,015 B2
(45) Date of Patent: Aug. 16, 2011

(54) LENS UNIT, LED HEAD, EXPOSING UNIT, IMAGE FORMING APPARATUS, AND SCANNING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/913,423

(22) Filed: Oct. 27, 2010

(65) Prior Publication Data

US 2011/0102886 A1    May 5, 2011

(30) Foreign Application Priority Data

Oct. 30, 2009    (JP) ................................. 2009-251370

(51) Int. Cl.
*G02B 27/10*    (2006.01)
(52) U.S. Cl. ..................... 359/622; 359/205.1; 359/621; 359/626; 347/244; 362/268; 399/218
(58) Field of Classification Search .. 359/204.1–207.11, 359/455, 457, 619, 621–623, 625–626, 628, 359/642, 796; 347/238, 241, 244, 246, 258; 362/231, 235, 248, 268, 326; 399/47, 51, 399/218
See application file for complete search history.

(56) References Cited

U.S. PATENT DOCUMENTS

| 2001/0028506 A1* | 10/2001 | Fujimoto et al. .............. 359/622 |
| 2009/0067055 A1* | 3/2009 | Yamamura .................... 359/622 |

FOREIGN PATENT DOCUMENTS

JP    2000-221445 A    8/2000

* cited by examiner

*Primary Examiner* — James Phan
(74) *Attorney, Agent, or Firm* — Marvin A. Motsenbocker; Mots Law, PLLC

(57) ABSTRACT

Lens pairs include: a first lens to form an intermediate image, which is an inverted image of an object, on an intermediate image plane; and a second lens to form an image of the object, which is an inverted image of the intermediate image, on the image plane. A ratio of SO1 (the distance between the first principal plane of the first lens and the object plane) to SI1 (the distance between the second principal plane of the first lens and the intermediate image plane) is substantially the same as the ratio of SI2 (the distance between the second principal plane of the second lens and the imaging plane) to SO2 (the distance between the first principal plane of the second lens and the intermediate image plane). The distance between the first lens and the object plane is different from a distance between the second lens and the imaging plane.

20 Claims, 11 Drawing Sheets

LENS UNIT, LED HEAD, EXPOSING UNIT, IMAGE FORMING APPARATUS, AND SCANNING APPARATUS

CROSS REFERENCE TO RELATED APPLICATIONS

This application claims priority based on 35 USC 119 from prior Japanese Patent Application No. P2009-251370 filed on Oct. 30, 2009, entitled "Lens Unit, LED Head, Exposing Unit, Image Forming Apparatus and Scanning Apparatus", the entire contents of which are incorporated herein by reference.

BACKGROUND OF THE INVENTION

1. Field of the Invention

The invention relates to a lens unit, a LED head, an exposing unit, an image forming apparatus, and a scanning apparatus.

2. Description of Related Art

A conventional lens unit is used in electrophotographic image forming apparatus having an LED head in which a plurality of LED elements (light emitting diodes) are arranged in an array or is used in a scanning apparatus (such as a scanner or a facsimile machine) having a light receiving portion in which a plurality of light receiving elements are arranged in an array. The lens unit serves as an optical system that forms, on an imaging plane, an erect one-to-one magnification image of an object in the form of a line.

Japanese Patent Application Laid-Open No. 2000-221445 (see Paragraphs 0017 to 0023 and FIG. 2) discloses a lens unit as an optical system. The lens unit includes plural lens pairs, each of which includes a first lens configured to form a converted reduced-size image of an object and a second lens configured to form a converted enlarged-size image of the converted reduced-size image, arranged in a substantially straight line. The lens unit thus forms an erect one-to-one magnification image of the object in the form of a line.

SUMMARY OF THE INVENTION

However, in the above lens unit, if the distance between the lens pair and the imaging plane varies, the image of the object goes out of focus (decentralized). Thus, a lens unit with a large focal depth cannot be obtained.

An object of an aspect of the invention is to provide the optical system whose focal depth is large.

An aspect of the invention is a lens unit including a lens array including plural lens pairs substantially linearly arrayed along a direction orthogonal to axes of the lens pairs. Each of the lens pairs comprises: a first lens configured to form an intermediate image, which is an inverted image of an object, on an intermediate image plane; and a second lens configured to form an image of the object, which is an inverted image of the intermediate image, on the imaging plane. The ratio of SO1 to SI1 is substantially the same as the ratio of SI2 to SO2, where S01 is the distance between the first principal plane of the first lens and the object plane, SI1 is the distance between the second principal plane of the first lens and the intermediate image plane, SO2 is the distance between the first principal plane of the second lens and intermediate image plane, and SI2 is the distance between the second principal plane of the second lens and the imaging plane. The distance between the first lens and the object plane is different from the distance between the second lens and the imaging plane.

According to the aspect of the invention, an optical system whose focal depth is large is obtained.

DETAILED DESCRIPTION OF EMBODIMENTS

Figure 1:
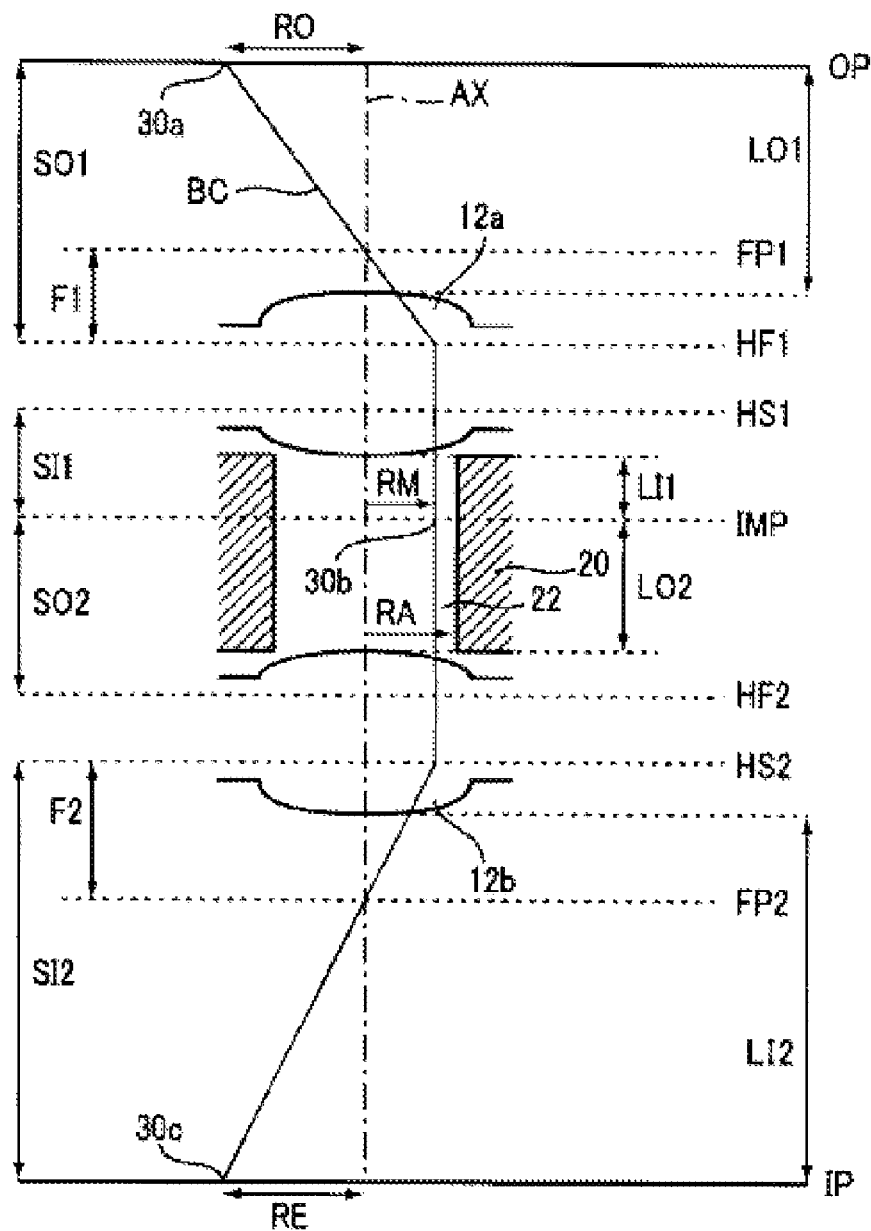
FIG. 1 is a sectional view of a lens unit of a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

A lens unit, an LED head, an exposing unit, an image forming apparatus, and a scanning apparatus according to embodiments will be described with reference to the drawings.

First Embodiment

First, a printer serving as an image forming apparatus of the first embodiment will be described with reference to FIG. 2 which illustrates the general configuration of the printer of the first embodiment.

Figure 2:
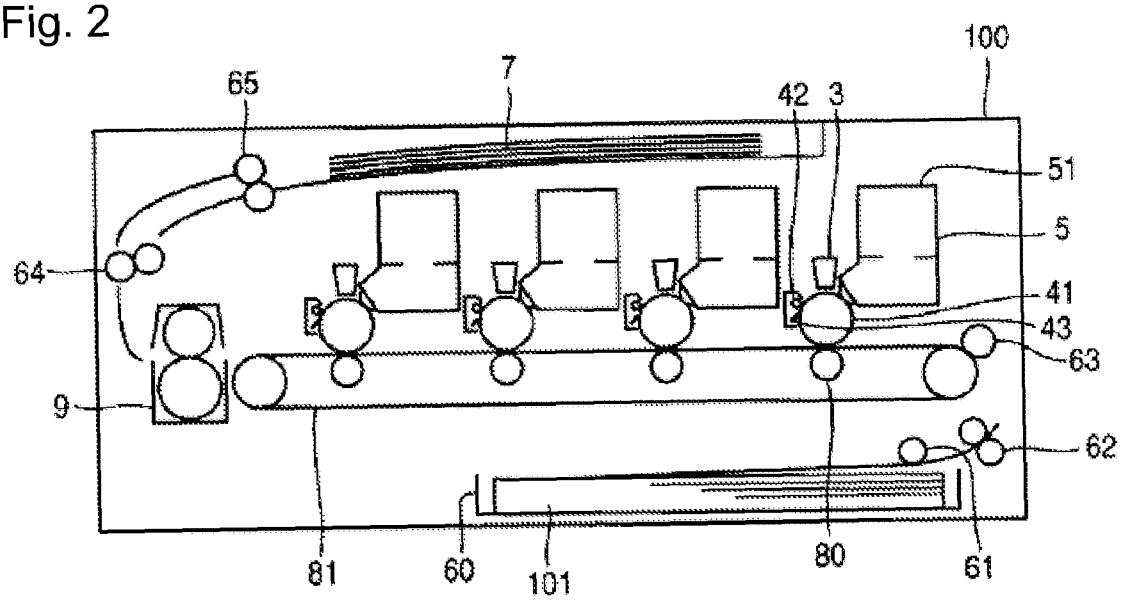
FIG. 2 is a diagrammatic view of the configuration of a printer of the first embodiment.

Referring to FIG. 2, printer 100 prints an image on a medium or paper 101 in accordance with image data using toner formed of a resin containing a pigment therein.

A paper cassette 60 is attached to printer 100 and holds a stack of paper 101 therein. Printer 100 includes therein feed roller 61 and transport rollers 62 and 63 along a transport path. Feed roller 61 feeds paper 101 from paper cassette 60 to transport rollers 62 and 63 along the transport path and transport rollers 62 and 63 transport paper 101 downstream in the transport path.

Printer 100 in this embodiment is an electrophotographic color printer, and includes toner image forming units for forming a yellow toner image, a magenta toner image, a cyan toner image, and a black toner image along the transport path. Each of the toner image forming units has a photoconductive drum 41 (serving as an electrostatic latent image carrier or a toner image carrier), charging roller 42 configured to charge the surface of photosensitive drum 41 by supplying electric charge to the surface of photosensitive drum 41, developing unit 5 configured to develop a toner image on photoconductive drum 41 by supplying toner to the electric latent image formed on photosensitive drum 41, and toner cartridge 51 configured to supply toner to developing unit 5. That is, toner cartridge 51 of the yellow toner image forming unit contains yellow toner, toner cartridge 51 of the magenta toner image forming unit contains magenta toner, and so on.

LED head 3 or an optical head is disposed facing the surface of photosensitive drum 41 and is configured to illuminate the charged surface of photoconductive drum 41, which is charged by charging roller 42, to form an electrostatic latent image on the surface of photosensitive drum 41 in accordance with the image data.

Opposite to photosensitive drums 43 is a toner image transfer unit configured to transfer the toner images formed on photosensitive drums 41 to paper 101. The toner image transfer unit includes transfer belt 81 such as an endless belt configured to transport paper 101 to photosensitive drums 43 in turn and toner image transfer rollers 80 to transfer, at a toner image transfer point between photosensitive drum 41 and toner image transfer roller 80, the toner images formed on photosensitive drums 41 to paper 101 that is transported by transfer belt 81. Toner image transfer rollers 80 are opposed to photosensitive drums 43, respectively, such that transfer roller 80 and photoconductive drum 41 sandwich transfer belt 81 and paper 101 that is transported by transfer belt 81.

Cleaning blade 43 is provided in contact with photoconductive drum 41 to scrape residual toner from photoconductive drum 41 after transfer of the toner image onto the paper 101.

Disposed downstream of the toner image transfer unit is a fixing unit 9 which is configured to fix the toner image on paper 101 by heating and pressing the toner image with paper 101, thereby forming printed paper 101. Printed paper 101, which was passed through the fixing unit 9, is transported by transport roller 64 and then discharged by discharge roller 65 onto discharge unit 7 such as a stacker.

Power supplies (not shown) apply predetermined voltages to charging roller 42 and transfer roller 80. The transfer belt 81, photoconductive drum 41, and the respective rollers are driven in rotation by motors (not shown) and gears (not shown). The developing unit 5, LED head 3, fixing unit 9, and respective motors (not shown) are connected to corresponding power supplies and controllers.

The printer 100 includes an external interface through which print data is received from an external apparatus such as a PC, and prints an image on the paper 101 in accordance with the print data received through the external interface.

The printer 100 of the above described configuration also includes a memory that stores control programs, and a control unit (serving as a controlling means and an arithmetic operation means) to run the control programs to perform overall control of the printer 100.

Next, the configuration of LED head 3 or an exposing unit will be described with reference to FIG. 3 which illustrates the general configuration of LED head 3 of the first embodiment.

Lens unit 1 is provided in LED head 3 and fixed to LED head 3 by means of holder 34. A plurality of light emitting diodes (LED elements) 30 as light emitting portions are aligned in a row along a horizontal direction in FIG. 3.

Reference numeral 41 designates photosensitive drum 41 on which an electric latent image is formed by LED head 3. Reference PV designates the rotational axis of photosensitive drum 41. Photosensitive drum 41 is provided such that its rotational axis PV extends along the horizontal direction in FIG. 3

Lens unit 1 extends in its longitudinal direction parallel to the straight line of LED elements 30. That is, the longitudinal direction of lens unit 1 is parallel to rotational axis PV of photosensitive drum 41. The optical axes of the microlenses in lens unit 1 are provided along the vertical direction in FIG. 3.

Figure 3:
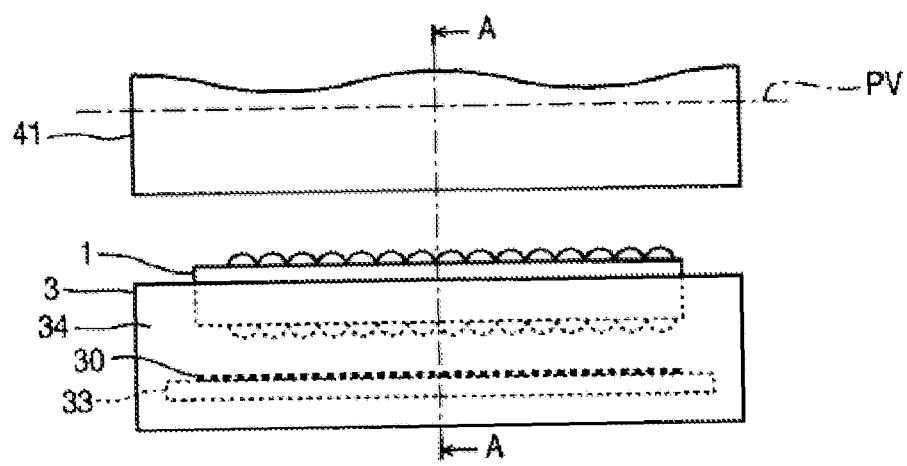
FIG. 3 is an explanatory view schematically illustrating a LED head of the first embodiment.
Figure 4:
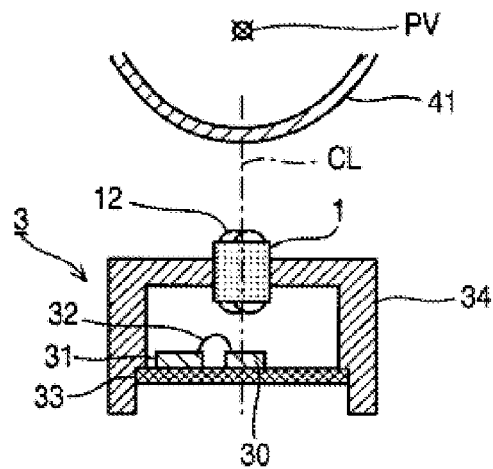
FIG. 4 is a sectional view schematically illustrating the LED head of the first embodiment.

FIG. 4 is a sectional view of LED head 3 of the first embodiment taken along line A-A of FIG. 3.

Figure 5:
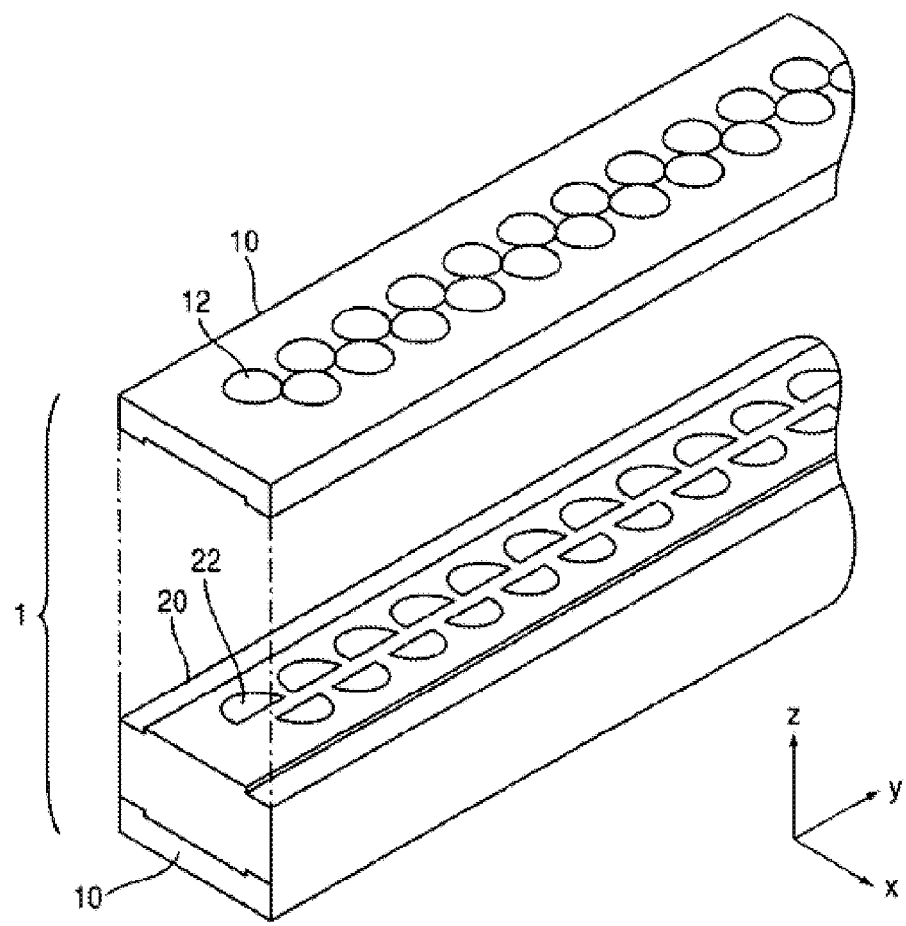
FIG. 5 is an exploded perspective view of the lens unit of the first embodiment.

Referring to FIG. 4, the optical axis of each microlens 12 in lens unit 1 is provided along direction Z shown in FIG. 5. Center line CL of lens unit 1 is aligned to a line that connects LED elements 30 and rotational axis PV of photosensitive drum 41. LED elements 30 are aligned along direction Y shown in FIG. 5 at pitch PD. Photosensitive drum 41 is provided such that rotational axis PV thereof is in direction Y shown in FIG. 5.

LED elements 30 and driver IC 31 are mounted on circuit board 33, and are electrically connected to one another by means of wires 32. LED elements 30 are driven by driver IC 31 to emit light.

Lens unit 1 forms the image of LED elements 30 on photosensitive drum 41. Thus, an electric latent image is formed on photosensitive drum 41 by selectively lighting LED elements 30 as photosensitive drum 41 rotates.

LED head 3 has a resolution of 600 dots per inch (dpi), i.e., 600 LED elements are disposed per inch (approximately 25.4 mm) at pitch PD of 0.0423 mm.

Next, the configuration of lens unit 1 will be described with FIG. 5, which is an exploded perspective view of lens unit 1 of the first embodiment.

Referring to FIG. 5, the lens unit 1 includes two lens arrays 10 and light shielding member 20 such that two lens arrays 10 sandwich light shielding member 20 therebetween.

Each lens array 10 includes two rows of plural microlenses 12 or plural lens elements in direction Y. Light shielding member 20 includes two rows of plural semicircle through-holes 22 serving as apertures in direction Y. The light rays emitted from LED elements 30 pass respectively through through-holes 22 which are respectively aligned with microlens 12 of lens arrays 10.

The array direction (row direction) of microlenses 12 and the array direction of through-holes 22 are parallel to each other and extend in direction Y. The direction of rays of light passing through microlenses 12 and the direction of rays of light passing through microlenses 12 are the same direction (direction Z).

Figure 6:
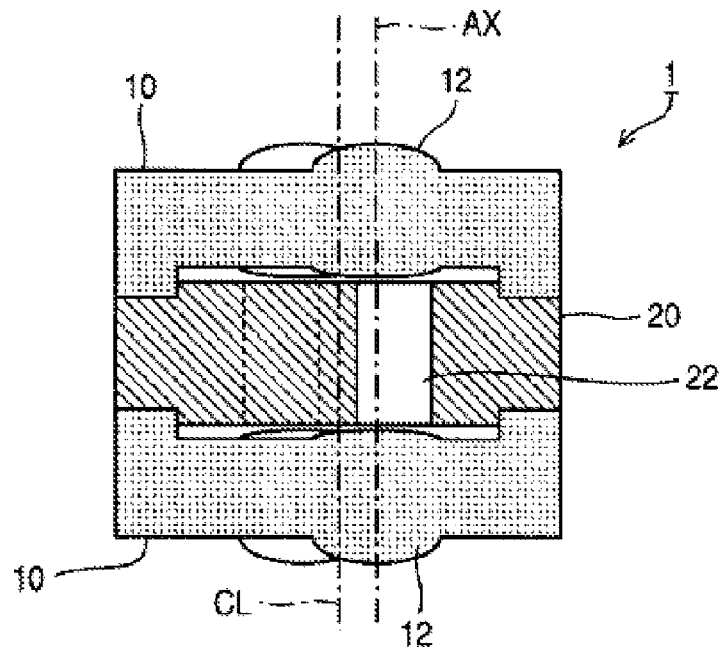
FIG. 6 is a sectional view of the lens unit along A-A line in FIG. 3 according to the first embodiment.

FIG. 6 is a sectional view of the lens unit of the first embodiment taken along A-A line in FIG. 3, that is, taken along a plane perpendicular to the array direction of microlenses 12 (direction Y in shown FIG. 5) at A-A line in FIG. 3.

In FIG. 6, reference AX designates the axes of microlenses 12 on the right side in FIG. 6, which extend along the vertical direction in FIG. 6 (direction Z in FIG. 5). The array direction of microlenses 12 extends along the vertical direction in FIG. 6 (direction Y in FIG. 5).

Reference CL denotes the center line of lens unit 1, which is the center line between the two rows of microlens 12, in a direction (direction X in FIG. 5 or the width direction of lens array 10) that is perpendicular to the array direction of microlenses 12 (direction Y in FIG. 5) and perpendicular to optical axes AX (direction Z in FIG. 5).

In lens unit 1, optical axes AX of microlens 12 of one of two lens arrays 10 are respectively aligned corresponding to optical axes AX of the other of two lens arrays 10, and optical axes AX of microlens 12 of two lens arrays 10 are aligned corresponding to through-holes 22 of light shielding member 20. That is to say, in lens unit 1, two rows of plural lens pairs, each of which is a pair of opposed microlenses 12 having optical axes AX aligned with each other, extend along a direction (direction Y in FIG. 5) perpendicular to optical axes AX.

Figure 7:
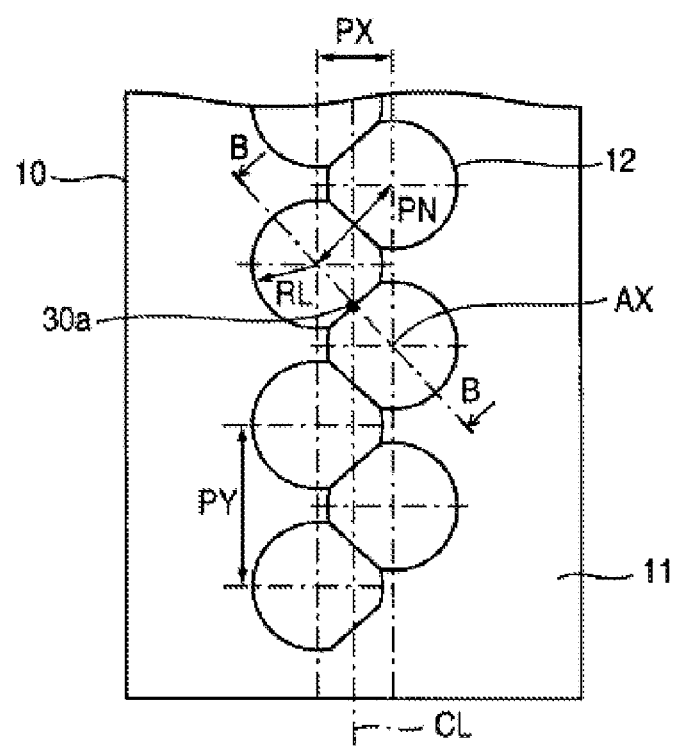
FIG. 7 is a plan view of the lens unit of the first embodiment.

FIG. 7 is a plan view of lens array 10 of the first embodiment that is provided on the object side (the LED element side) of lens unit 1.

Referring to FIG. 7, lens array 10 on the object side (the LED element side) includes two parallel rows of microlenses 12 in which each microlens 22 in one of the two rows extends into adjacent two microlenses 22 in the other of the two rows. The optical axes AX of adjacent microlenses 12 in each row are spaced apart by distance PY. Reference PX between the center lines of the two parallel rows of microlenses 12 (that is, a distance between a line connecting axes AX in one of the two parallel rows and a line connecting axes AX in the other of the two parallel rows) in a direction (direction X in FIG. 5) is perpendicular to the array direction of microlenses 12 and perpendicular to optical axes AX.

The center lines of the two rows of microlenses 12 are parallel to the center line of the row of LED elements 30 (not illustrated in FIG. 7). The distance between the center line of one of the two rows of microlenses 12 and the center line of the row of LED elements 30 (not shown) is the same as the distance between the center line of the other of the two rows and the center line of the row of LED elements 30.

Reference PN donates the distance between the optical axis (the center) of microlens 12 in one of the two rows and the optical axis (the center) of adjacent microlens 12 in the other of the two rows. Distance PN is less than distance PY (PN<PY). The outer circumference of microlens 12 in one of the two rows and the outer circumference of adjacent microlens 12 in the other of the two rows are in contact with each other such that the outer circumference of each microlens 12 is a circle of radius of RL that is partially cut away by two straight lines at positions apart from axis AX by a distance of PN/2.

Next, lens array 10 on the imaging plane side (the photosensitive drum side) of lens unit 1 will be described. Lens array 10 on the imaging plane side has the same configuration as lens array 10 on the object side (the LED element side) except for the size. Specifically, in lens array 10 on the imaging plane side, microlenses 12 have a radius of RL2, which is different from the radius of RL of microlenses 12 in lens array 10 on the object side shown in FIG. 7. That is to say, lens array 10 whose microlenses 12 have the radius of RL in lens array 10 on the object side (the LED element side), while lens array 10 whose microlenses 12 have the radius of RL2 in lens array 10 on the imaging plane.

Note that the lens arrays 10 are formed of an optically transmissive material that allows the light emitted from objects (LED elements 30) to pass therethrough.

Lens array 10 of lens unit 1 of the first embodiment is injection-molded from an optical resin which is a cycloolefin-based resin (ZEONEX E48R (registered trademark), available from JAPAN ZEON), thereby providing a plurality of microlenses 12 formed in one piece construction.

Microlens 12 has a polynomial aspheric surface expressed by Formula (1) as follows: where $Z(r)$ is a rotating coordinate system having a radius r and an axis in line with the optical axis of the microlens 12 (where the apex of curved surfaces of microlens 12 is a point of origin and a direction toward microlens 12 is expressed by positive value and a direction toward the air is expressed by negative value), r is a radius given by Formula (2) in terms of X ordinate and Y ordinate, k is a conic constant, C is a radius of curvature, A is an aspheric coefficient, and m and n are positive integers.

$$Z(r) = \frac{\frac{r^2}{C}}{1 + \sqrt{1 - (1+k)\left(\frac{r}{C}\right)^2}} + \sum_{m=2}^{l} A_{2m} r^{2m}. \quad \text{[Formula (1)]}$$

$$r = \sqrt{X^2 + Y^2} \quad \text{[Formula (2)]}$$

Figure 8:
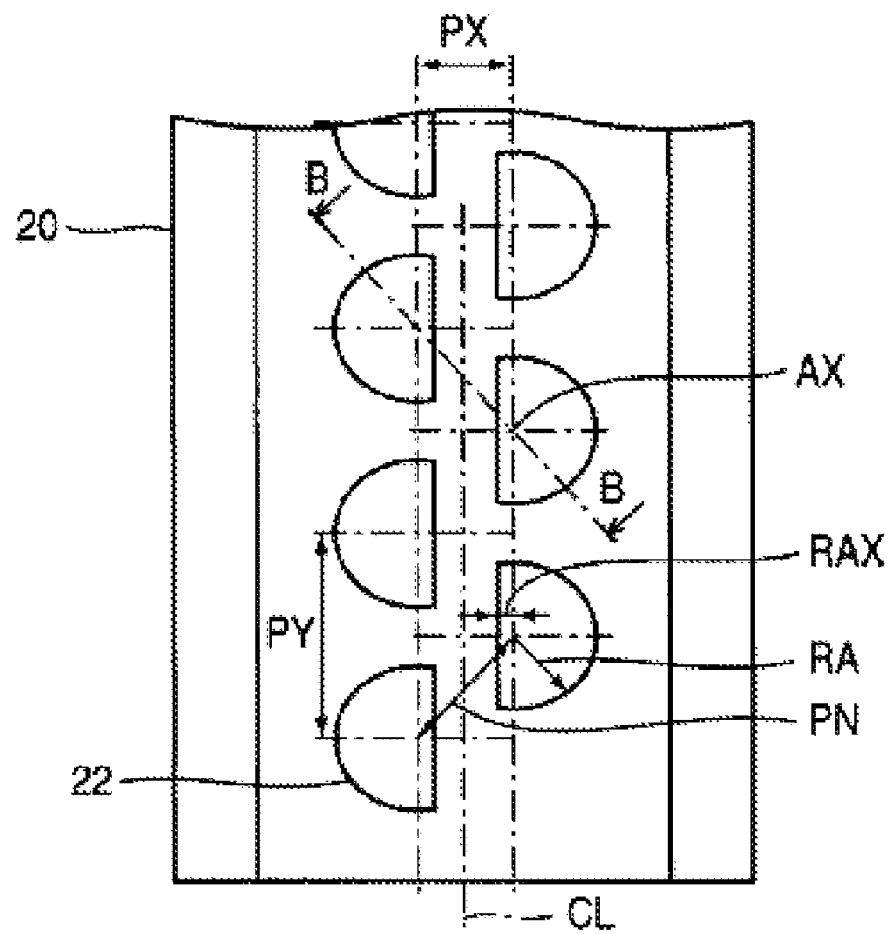
FIG. 8 is a plan view of a shielding member of the first embodiment.

FIG. 8 is a plan view of shielding member 20 of the first embodiment. Referring to FIG. 8, light shielding member 20 has two rows of through-holes 22 with distance PX between the center lines of the two rows in a direction (direction X in FIG. 5) that is perpendicular to optical axes AX of microlenses 12 (direction Z in FIG. 5) and the row direction of through-holes 22 (direction Y in FIG. 5). Adjacent two through-holes 22 in each row have distance PY therebetween.

Through-holes 22 are provided corresponding to microlenses 12. The center of through-hole 12 in one of the two rows and the center of adjacent through-hole 12 in the other of the two rows are spaced apart by distance PN. Distance PN is less than distance PY. Through-hole 22 is a circle of radius RA that is partially cut away by a line that is parallel to the row direction (direction Y in FIG. 5) of through-holes 22 and is spaced apart from the center of through-hole 12 by distance RAX.

The centers (the optical axes) of through-holes 22 are aligned corresponding to optical axes AX of microlenses 12. Note that light shielding member 20 is formed of a material that prevents the light emitted from objects (LED elements 30) from passing therethrough. Light shielding member 20 of this embodiment is injection-molded from black polycarbonate.

Next, lens unit 1 will be described in detail with reference to FIG. 7 and FIG. 9 which illustrates the operation of lens arrays 10 according to the first embodiment.

FIG. 7 is a plan view of one of lens arrays 10 illustrating the positional relationship between the objects (LED elements 30) and optical axes AX. Object 30a shows LED element 30 that is provided at the midpoint between optical axes AX of two adjacent microlenses 12.

Figure 9:
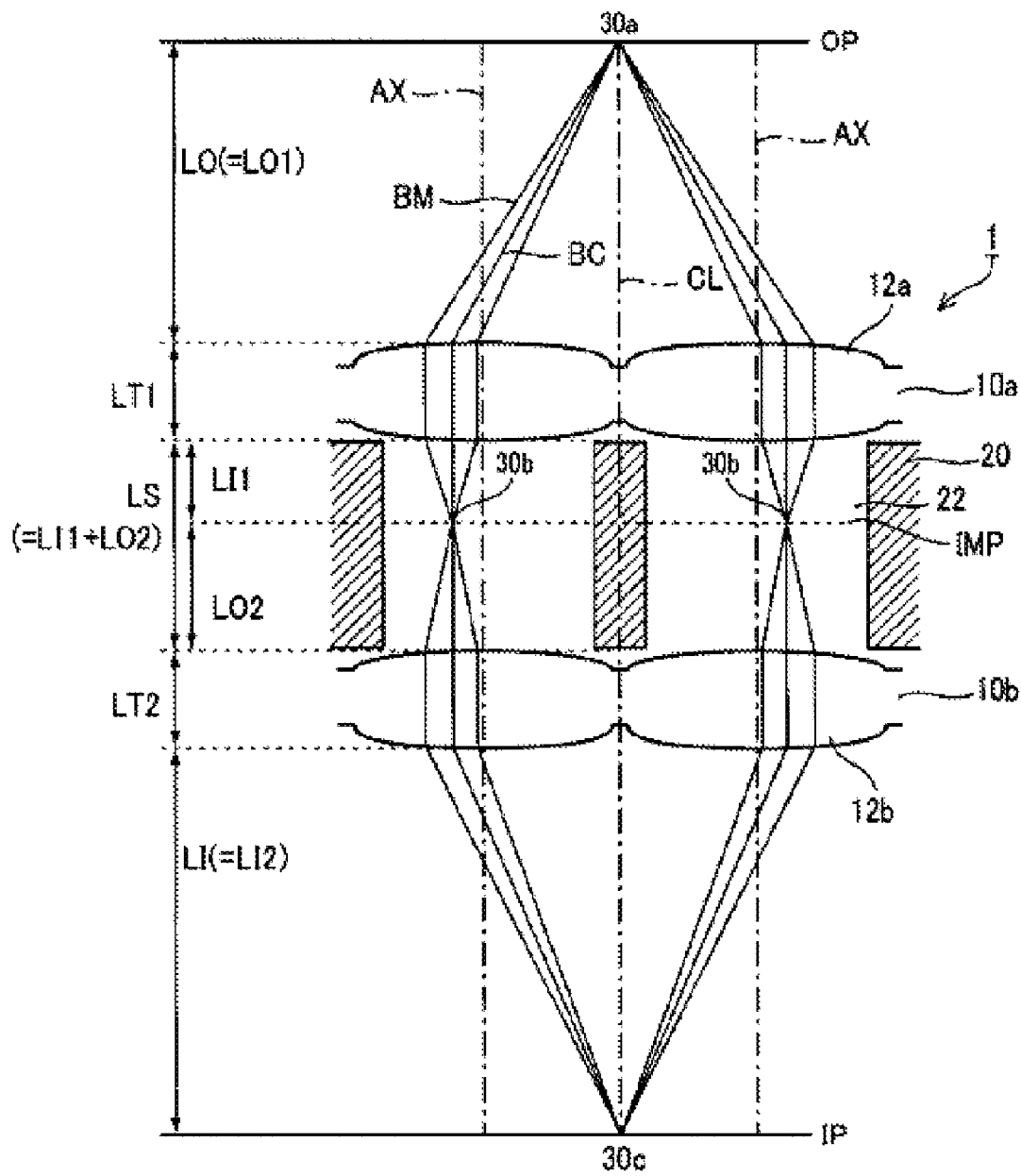
FIG. 9 is a sectional view of the lens unit along B-B line in FIG. 8 according to the first embodiment.

FIG. 9 is a sectional view of lens unit 1 having lens arrays 10, object plane OP, and imaging plane IP, taken along a plane including optical axes AX of the adjacent two microlenses 12 or taken along B-B line shown in FIGS. 7 and 8.

Referring to FIG. 9, first lens array 10a, which is lens array 10 on the object side (the LED side), is provided at a position spaced apart from object plane OP of lens unit 1 by distance LO. Second lens array 10b, which is lens array 10 on the imaging plane side, is provided at a position spaced apart from first lens array 10a by distance LS. Imaging plane IP of Lens unit 1 is provided at a position spaced apart from second lens array 10b by distance LI along the direction of optical axes AX.

Light shielding member 20 is disposed between first lens array 10a and second lens array 10b. First microlenses 12a, which are microlenses 12 of first lens array 10a, and second microlenses 12b, which are microlenses 12 of second lens array 10b, are provided such that optical axes AX of first microlenses 12a and optical axes AX of second microlenses 12b are respectively aligned with each other.

In this embodiment, distance LO and distance LI are different from each other and distance LI is lager than distance LO.

Each first microlens 12a has a thickness of LT1 and forms intermediate image 30b, which is an inverted image of object 30a, at intermediate image plane IMP. Intermediate image plane IMP is spaced apart from first microlens 12a by distance LI1 along the direction of optical axes AX and is spaced apart from second microlens 12b by distance LO2 along the direction of optical axes AX.

Each second microlens 12b has a thickness of LT and forms image 30c, which is an inverted image of intermediate image 30b at intermediate image plane IMP, at a plane spaced apart from second microlens 12b by distance LI2 along optical axes AX.

Distance LO, which is a distance between object plane OP of lens unit 1 to first microlenses 12a, is the same as distance LO1. Distance LS, which is a distance between first microlenses 12a and second microlenses 12b, is equal to the sum of distance LI1 and distance LO2. Distance LI, which is a distance from second microlenses 12b to imaging plane IP of lens unit 1, is the same as distance LI2.

In this embodiment, distance LO1 is different from distance LI2. Since photosensitive drum 41 whose surface is imaging plane IP is a rotating member, distance LI2 tends to be variable. Thus, distance LI2 is designed relatively larger than distance LO1.

Lens unit 1 has opposed lens arrays 10 (10a and 10b) sandwiching light shielding member 20 therebetween and spaced apart from each other by a distance to form an image on imaging plane IP, thereby making up an optical system to form an erect one-to-one magnification image. In other words, an optical system that has two microlenses 12 whose optical axes AX are aligned with each other forms an erect one-to-one magnification image of LED element 30 on the surface of photosensitive drum 41.

Light shielding member 20 is provided between lens arrays 10 and is configured to prevent stray light which leaks from the optical system having a pair of opposite microlenses 12a and 12b that have the common optical axis into the other optical systems and to prevent light leaking from the other optical systems from entering the optical system.

The operation of the above configuration will be described below. First, the operation of printer 100 will be described with reference to FIG. 2.

Charging roller 42 energized by an unillustrated power supply charges the surface of photosensitive drum 41 of printer 100. When the charged surface of photosensitive drum 41 reaches the vicinity of LED head 3 as the photosensitive drum 41 rotates, LED head 3 emits light to form an electric latent image on the charged surface of photosensitive drum 41. The electric latent image on the charged surface of photosensitive drum 41 is developed with toner supplied by developing unit 5 and thus becomes a toner image on the surface of photosensitive drum 41.

Meanwhile, feed roller 61 feeds paper 101 from paper cassette 60 to transport rollers 62 and 63, and then transport rollers 62 and 63 transport paper 101 toward transfer belt 81 and transfer roller 80.

When the toner image on the surface of photosensitive drum 41 reaches the vicinity of toner image transfer roller 80 and transfer belt 81 as photosensitive drum 41 rotates, toner image transfer roller 80 and transfer belt 81, energized by the unillustrated power supply, transfer the toner image from the surface of photosensitive drum 41 onto paper 101.

Next, the rotation of transfer belt 81 transports paper 101 having the transferred toner image thereon to fixing unit 9, and then fixing unit 9 presses and heats the toner image on paper 101 to fuse and fix the toner image on paper 101. Paper 101 with the toner image fixed thereon is transported by and discharged by discharge roller 65, and then the operation of printer 100 ends.

Next, the operation of LED head 3 or an exposing unit will be described with reference to FIG. 4. The controller of printer 100 outputs control signals to LED head 3 based on the image data. In accordance with the control signals, driver IC 31 drives LED elements 30 to emit light having a predetermined amount. The light emitted from LED elements 30 is incident into lens unit 1, which in turn forms images of LED elements 30 on photosensitive drum 41.

Next, the operation of lens unit 1 will be described with reference to FIG. 9. The light emitted from object 30a (LED element 30) enters first microlenses 12a, which in turn forms intermediate image (inverted image) 30b of LED element 30 in intermediate image plane IMP, which is spaced apart from first microlenses 12a by distance LI1 along optical axis AX, while light shielding member 20 blocks a part of the light that does not contribute to the formation of intermediate image 30b.

Second microlenses 12b forms the image 30c of object 30a, which is an image of intermediate image 30b, in imaging plane IP (the surface of photosensitive drum 41), while light shielding member 20 blocks a part of the light that does not contribute to the formation of image 30c.

Intermediate image 30b is formed by first microlenses 12a and is an inverted image of object 30a having a size smaller than that of object 30a. Image 30c is formed by second microlenses 12b and is an inverted image of intermediate image 30b having a size larger than intermediate image 30b. A set of first microlenses 12a and second microlenses 12b are designed to form a telecentric system in which the chief rays for all points across the object are collimated. That is, lens unit 1 forms an erect image of object 30a having the same size as that of object 30a.

Next, the operation of lens unit 1 will be described with reference to FIG. 1. FIG. 1 is a sectional view of first microlenses 12a, through-holes 22, and second microlenses 12b. Referring to FIG. 1, it is assumed that object 30a is disposed at a position on object plane OP. Reference RO is a distance between optical axis AX and object 30a, and reference RE is a distance between optical axis AX and image 30c which is the image of object 30a formed by lens unit 1.

In FIG. 1, reference BC shows a chief ray that is emitted from object 30a and contributes to the formation of image 30c. Since there is the telecentric optical system between first microlenses 12a and second microlenses 12b, chief rays BC between first microlenses 12a and second microlenses 12b are parallel to optical axis AX.

Reference FP1 is the first focal plane of first microlenses 12a. FP2 is the second focal plane of second microlenses 12b. HF1 is the first principal plane of first microlenses 12a. HS1 is the second principal plane of first microlenses 12a. HF2 is the first principal plane of second microlenses 12b. HS2 is the second principal plane of second microlenses 12b. SO1 is a distance from object plane OP to first principal plane HF1. SI1 is a distance from the second principal plane HS1 to intermediate image plane IMP. SO2 is a distance from intermediate image plane IMP to first principal plane HF2. SI2 is a distance from imaging plane IP to the second principal plane HS2.

F1 is the focal length of first microlenses 12a, which is a distance from first focal plane FP1 to first principal plane HF1. F2 is the focal length of second microlenses 12b, which is a distance from second focal plane FP2 to second principal plane HS2. Radius RA of through-hole 22 is a distance from the optical axis AX to the inner circumferential face of through-hole 22.

In FIG. 1, distance RO from object 30a to optical axis AX is expressed in Formula (3) by using distance RM between intermediate image 30b and optical axis AX.

$$r = \sqrt{X^2 + Y^2}$$ [Formula (3)]

Where an object and its associated image are conjugate, that is, rays from the object is focused at the position of the image, Formula (4), which is the thin lens equation, are obtained using distance SO between the first principal plane and the object plane, distance SI between the second principal plane and the imaging plane, and the focal length F of a lens.

$$\frac{1}{SO} + \frac{1}{SI} = \frac{1}{F}$$ [Formula (4)]

Formula (5) is obtained by combining Formula (3) and a formula in which distance SO, distance SI, and focal length F of Formula (4) are replaced with distance SO1, distance SI1, and focal length F1.

$$\frac{RO}{RM} = \frac{SO1}{SI1}$$ [Formula (5)]

Distance Re from optical axis AX to image 30c in FIG. 1 is expressed in Formula (6) using distance R from optical axis AX to intermediate image 30b.

$$RE = RM \frac{SI2 - F2}{F2}$$ [Formula (6)]

Formula (7) is obtained by combining Formula (6) and a formula in which distance SO, distance SI, and focal length F of Formula (4) are replaced with distance SO2, distance SI2, and focal length F2.

$$\frac{RE}{RM} = \frac{SI2}{SO2}$$ [Formula (7)]

Since lens unit 1 forms an erect one-to-one magnification image, that is, distance RE is equal to distance RO, Formula (8) is obtained based on Formula (5) and Formula (7).

$$\frac{SI2}{SO2} = \frac{SO1}{SI1}$$ [Formula (8)]

Therefore, a ratio of distance SO1 to distance SI1 is equal to a ratio of distance SI2 to distance SO2, which means that lens unit 1 forms an erect one-to-one magnification image (that is, lens unit 1 forms an erect image of the object having the same size as the object on the imaging plane). Here, "distance SO1≈distance LO1", "distance SI1≈distance LI1", "distance SO2≈distance LO2", and "distance SI2≈distance LI2". Thus, Formula (9) is obtained.

$$\frac{LI2}{LO2} = \frac{LO1}{LI1}$$ [Formula (9)]

Thus, the ratio of distance LO1 to distance LI1 is equal to the ratio of distance LI2 to distance LO2, which means that lens unit 1 forms erect one-to-one magnification image (that is, lens unit 1 forms an erect image of the object having the same size as the object on the imaging plane). Based on Formula (3), viewing field radius RV (the radius of the maximum viewing field) of first microlenses 12a is expressed by Formula (10), since RA represents the maximum value of distance RM.

$$RV = RA \frac{SO1 - F1}{F1}$$ [Formula (10)]

Formula (11) is obtained based on Formula (5).

$$RV = RA \frac{SO1}{SI1}$$ [Formula (11)]

Next, the operation of lens unit 1 will be described with reference to FIGS. 10A to 10D. FIGS. 10A to 10D illustrate positional relationships between LED elements 30 and microlenses 12.

Each of FIGS. 10A to 10D illustrates the positions of optical axes AX of microlenses 12 and maximum viewing field CV of microlenses 12 on object plane OP. Note that the array direction of microlenses 12 and the array direction of LED elements 30 extend in the vertical direction in FIGS. 10A to 10D and optical axes AX extend in a direction orthogonal to plane of the figures.

Figure 10A:
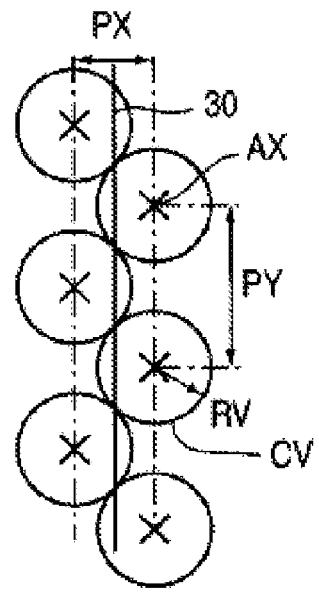
FIGS. 10A to 10D are explanatory views illustrating the positional relationships between LED elements and microlenses according to the first embodiment.
Figure 10B:
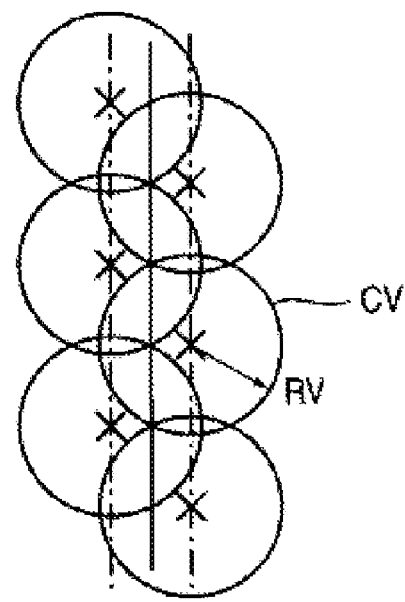

FIGS. 10A and 10B are views of examples where microlenses 12 are arrayed in two rows; FIG. 10A illustrates a case where viewing field radius RV of the lens pair (12a and 12b) is the smallest and maximum viewing fields CV of two of the lens pairs are overlapped in a straight line along the array direction of LED elements 30; and FIG. 10B illustrates a case where viewing field radius RV of the lens pair (12a and 12b) is the largest and maximum viewing fields CV of two of the lens pairs are overlapped in a straight line along the array direction of LED elements 30.

In the case where microlenses 12 are arrayed in two rows, viewing field radius RV of the lens pair is expressed as Formula (12);

$$\sqrt{\left(\frac{PX}{2}\right)^2+\left(\frac{PY}{4}\right)^2} \le RV \le \sqrt{\left(\frac{PX}{2}\right)^2+\left(\frac{PY}{2}\right)^2} \quad \text{[Formula (12)]}$$

where PY represents the pitch (center-to-center distance) of first microlenses 12a in the array direction, and PX represents the pitch (center to center distance) of two rows of first microlenses 12a.

Based on Formula (10) and Formula (12), Formula (13) is obtained.

$$\sqrt{\left(\frac{PX}{2}\right)^2+\left(\frac{PY}{4}\right)^2} \le RA\frac{SO1-F1}{F1} \le \sqrt{\left(\frac{PX}{2}\right)^2+\left(\frac{PY}{2}\right)^2} \quad \text{[Formula (13)]}$$

Formula (14) is obtained, based on the relationship "distance LO1≈distance SO1".

$$\sqrt{\left(\frac{PX}{2}\right)^2+\left(\frac{PY}{4}\right)^2} \le RA\frac{LO1-F1}{F1} \le \sqrt{\left(\frac{PX}{2}\right)^2+\left(\frac{PY}{2}\right)^2} \quad \text{[Formula (14)]}$$

Formula (15) is obtained by combining Formula (11) and Formula (12)

$$\sqrt{\left(\frac{PX}{2}\right)^2+\left(\frac{PY}{4}\right)^2} \le RA\frac{SO1}{SI1} \le \sqrt{\left(\frac{PX}{2}\right)^2+\left(\frac{PY}{2}\right)^2} \quad \text{[Formula (15)]}$$

Formula (16) is obtained, based on the relationship "distance LO1≈distance SO1" and the relationship "distance LI1≈distance SI1".

$$\sqrt{\left(\frac{PX}{2}\right)^2+\left(\frac{PY}{4}\right)^2} \le RA\frac{LO1}{LI1} \le \sqrt{\left(\frac{PX}{2}\right)^2+\left(\frac{PY}{2}\right)^2} \quad \text{[Formula (16)]}$$

Figure 10C:
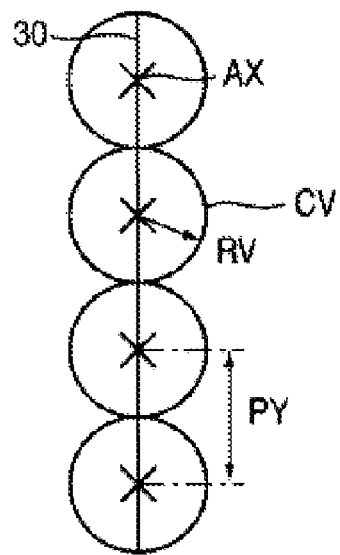
Figure 10D:
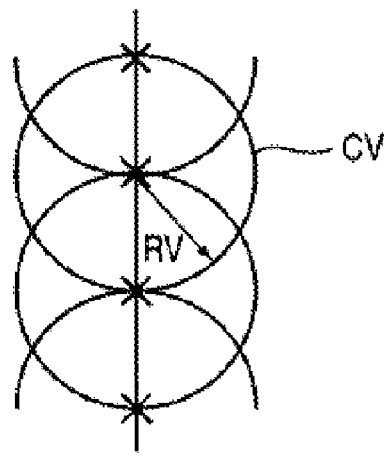

FIGS. 10C and 10D are views of examples where microlenses 12 are arrayed in one row: FIG. 10C illustrates a case where viewing field radius RV of the lens pair (12a and 12b) is the smallest and maximum viewing fields CV of two of the lens pairs are overlapped; and FIG. 10D illustrates a case where viewing field radius RV of the lens pair (12a and 12b) is the largest and maximum viewing fields CV of two of the lens pairs are overlapped.

In the case where microlenses 12 are arrayed in one row, viewing field radius RV of the lens pair is expressed as Formula (17):

$$\frac{PY}{2} \le RV \le PY \quad \text{[Formula (17)]}$$

where PY represents the pitch (center to center distance) of first microlenses 12a in the array direction.

Based on Formula (10) and Formula (17), Formula (18) is obtained.

$$\frac{PY}{2} \le RA\frac{SO1-F1}{F1} \le PY \quad \text{[Formula (18)]}$$

Based on the relationship "distance LO1≈distance SO1", Formula (19) is obtained.

$$\frac{PY}{2} \le RA\frac{LO1-F1}{F1} \le PY \quad \text{[Formula (19)]}$$

Based on Formula (11) and Formula (17), Formula (20) is obtained.

$$\frac{PY}{2} \le RA\frac{SO1}{SI1} \le PY \quad \text{[Formula (20)]}$$

Based on the relationship "distance LO1≈distance SO1", Formula (21) is obtained.

$$\frac{PY}{2} \le RA\frac{LO1}{LI1} \le PY \quad \text{[Formula (21)]}$$

Figure 11A:
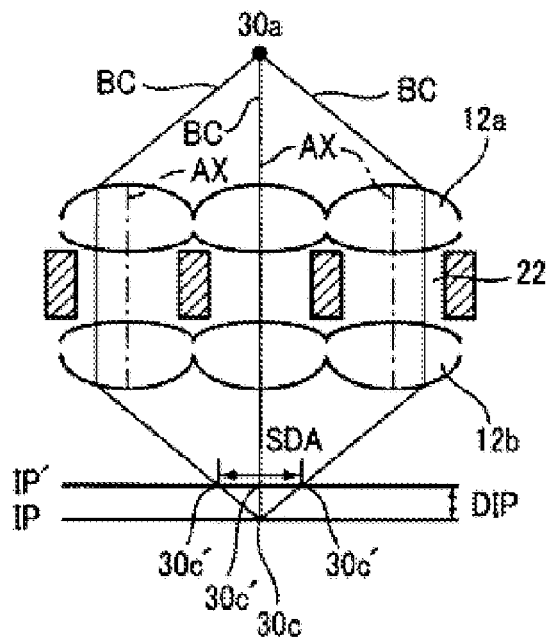
FIGS. 11A to 11C are explanatory views illustrating the operation of the lens unit according to the first embodiment.
Figure 11B:
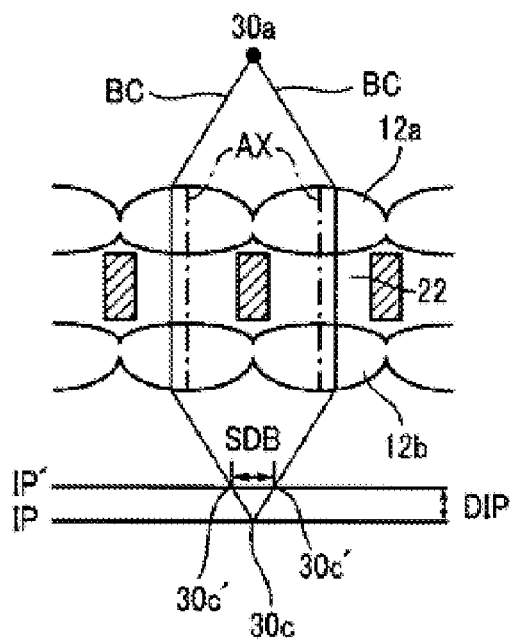
Figure 11C:
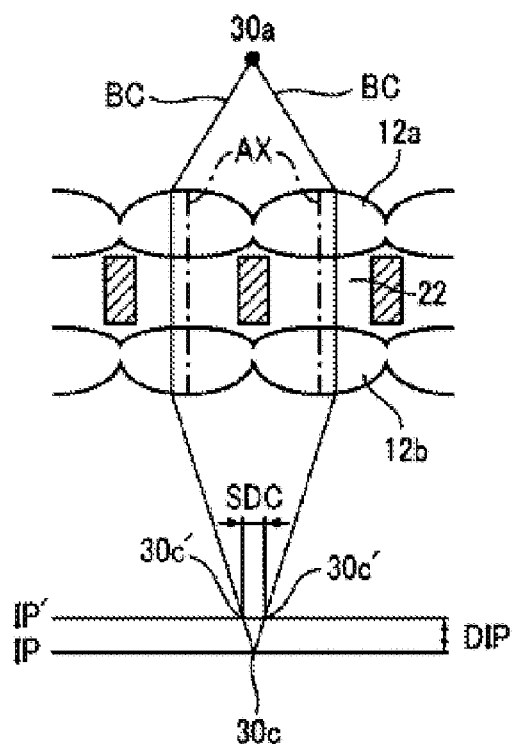

Next, the operation of lens unit 1 will be described with reference to FIGS. 11A to 11C illustrating the operation of lens unit 1 of the first embodiment.

The array direction of microlenses 12 (first microlenses 12a and second microlenses 12b) and through-holes 22 extends a horizontal direction in FIGS. 11A to 11C, while optical axes AX extend in a vertical direction in FIGS. 11A to 11C. Object 30a is illustrated at an upper portion in FIGS. 11A to 10C and imaging plane IP is illustrated at a lower portion in FIGS. 11A to 11C.

In FIGS. 11A to 11C, IP' represents an imaging plane which is shifted from imaging plane IP by distance DIP along optical axis AX, BC represents the chief ray among rays of the light from object 30a to microlenses 12.

FIG. 11A illustrates the configuration of a conventional lens unit with its light, to be compared with the effect of the first embodiment. In the conventional lens unit shown in FIG. 11A, viewing fields of more than three of microlenses 12 (more than three of the lens pairs) are overlapped. Thus, the conventional lens unit shown in FIG. 11A forms image 30c' having more than three decentralized (divided) image pieces on imaging plane IP' and thus image 30c' on imaging plane IP' has enlarged size SDA. That is, image 30c' on imaging plane IP' is larger than image 30c on imaging plane IP.

On the other hand, in lens unit 1 according to the first embodiment shown FIG. 11B, viewing fields of two microlenses 12 (two of the lens pairs) are overlapped. Lens unit 1 forms image 30c' having two decentralized (divided) image pieces on imaging plane IP'. Thus, image 30c' on image plane IP' of the first embodiment has size SDB that is larger than image 30c on image plane IP but smaller than size SDA of image 30c' on image plane IP' of the conventional lens unit. Therefore, lens unit 1 according to the first embodiment has a focal depth larger than the conventional lens unit.

Further, according to lens unit 1 of the first embodiment, distance LI (=distance LI2) between second microlenses 12b and imaging plane IP is designed larger than distance LO (=distance LO1) between first microlenses 12a and object plane OP. Thus, size SDC of image 30c' on imaging plane IP' shown in FIG. 11C is smaller than size SDA shown in FIG. 11A and size SDB shown in FIG. 11B. That is, lens unit 1 according to the first embodiment reduces the size of the image on plane IP' shifted from imaging plane IP by distance DIP and makes its focal depth larger.

As described above, in lens unit 1, a ratio of distance SO1 to distance SI1 is substantially the same as a ratio of distance SI2 to distance SO2, and the distance between first microlenses 12a and the object plane is designed different from the distance between second microlenses 12b and the imaging plane. Therefore, even if the distance between the imaging plane and the microlens on the side of the imaging plane is changed, lens unit 1 prevents the image on the imaging plane from being decentralized (divided) and makes its focal depth deeper.

Figure 12A:
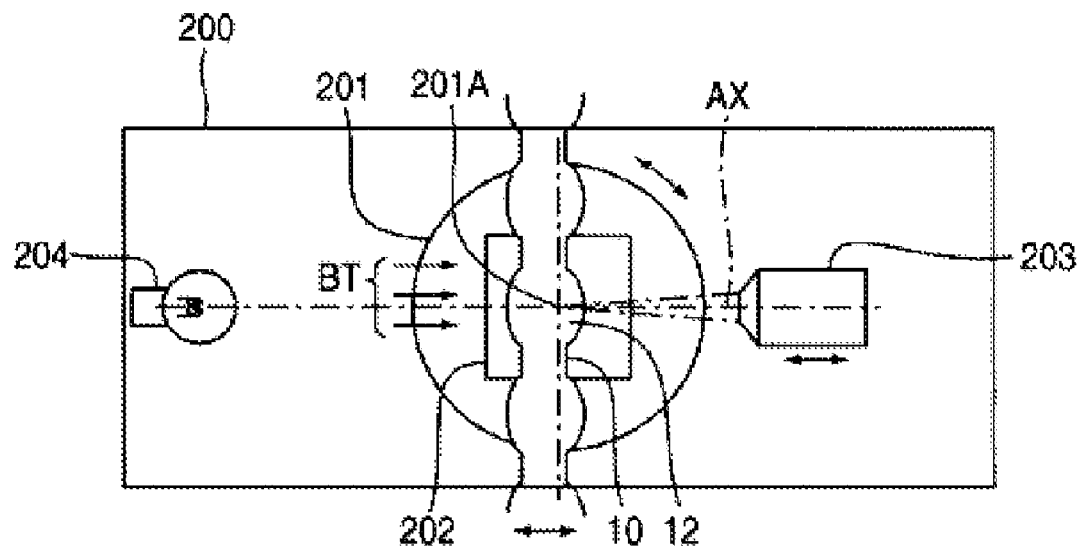
FIGS. 12A and 12B are explanatory views illustrating the configuration of a focometer according to the first embodiment.
Figure 12B:
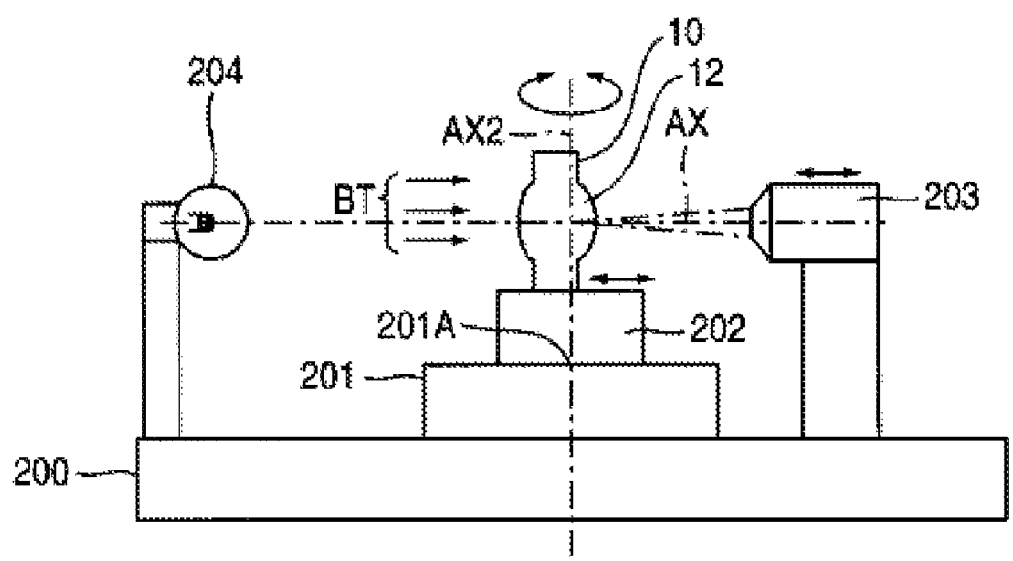

Next, focometer 200 according to the first embodiment will be described with reference to FIGS. 12A and 12B illustrating the focometer. FIG. 12A is a plan view of the outline of the focometer, and FIG. 12B is a side view of the outline of the focometer.

Referring to FIGS. 12A and 12B, focometer 200 includes turntable 201, stage 202, microscope 203, and light source 204.

Turntable 201 is rotatable about its rotational axis 201A, and thus stage 202 and microlens 12 (lens 12 to be tested) provided on turntable 201 are rotatable about rotational axis 201A. Microlens 12 is fixed on stage 202 in such a manner that optical axis AX of microlens 12 coincides with the optical axis of microscope 203. Stage 202 is configured to be movable along a direction parallel to optical axis AX.

Microscope 203 is configured to be movable along a direction parallel to optical axis AX and to measure a travel distance of microscope 203 from a reference point where the imaging point of microscope 203 coincides with rotational axis 201A. Light source 204 emits light in such a manner that parallel rays BT of the light enter microlens 12.

Next, the method of measuring the focal length of microlens 12 will be described with reference to FIGS. 12A and 12B. An image of parallel light rays BT which are emitted from the light source and go through microlens 12 is observed with microscope 203, while moving microscope 203 away from microlens 12.

When the image of parallel light rays BT is smallest, stage 202 and microscope 203 are separately moved, to find a position of stage 202 and a position of microscope 203 where the image of parallel light rays BT is not moved by the rotation of turntable 201 by a small angle.

Then, travel distance Z1, which is a distance from rotational axis 201A to a position of microscope 203 where the image of parallel light rays BT is not moved by the rotation of turntable 201 by a small angle, is measured. Note that such travel distance Z1 is equal to focal length F of microlens 12. Here, the position of rotational axis 201A corresponds to the first principal plane of microlens 12.

Next, while the position of stage 202 is fixed, only microscope 203 is moved toward microlens 12, to find a position where the imaging point of microscope 203 coincides with the apex of the curvature surface of microlens 12. Then, travel distance Z2, which is a distance from rotational axis 201A of microscope 203 to the position of microscope 203 where the imaging point of microscope 203 coincides with the apex of the curvature surface of microlens 12, is measured.

Next, distance LO from the apex of the curvature surface of microlens 12 to the object plane is measured by a different method. With this, distance SO, which is a distance from the object plane of microlens 12 to the principal plane of microlens 12, is obtained by calculating the sum of travel distance Z2 and distance LO (SO=Z2+LO).

The above described method of measuring the focal length is known as a nodal slide method.

Using LED head 3 with lens array 10 according to the first embodiment, MTF (Modulation Transfer Function) indicating the resolution of the image is measured. As a result of the measurement, MTF is equal to or greater than 80%.

Note that MTF indicates the resolution of an exposing unit (LED head 3) and indicates contrast of the images of activated LED elements 30 of the exposing unit. MTF of 100% indicates that the contrast of the images is maximum and thus the resolution of the exposing unit is high. As the value of MTF becomes smaller, the contrast becomes smaller and thus the resolution of the exposing unit becomes smaller.

MTF (%) is defined as the following equation:

$$MTF=(EMAX-EMIN)/(EMAX+EMIN)\times 100(\%)$$

where EMAX represents the maximum light intensity of the images and EMIN represents the minimum light intensity of the adjacent two images.

On the measurement of MTF, the image at distance LI (mm) from the apex of second microlens 12b of the imaging plane side on imaging plane IP of lens unit 1 of LED head 3 is taken by a microscopic digital camera. From the taken image, the distribution of the light intensity of the image of LED element 30 was analyzed to calculate MTF.

On the measurement of MTF, LED head 3 having LED elements 30 whose pitch PD is 0.0423 mm (PD=0.0423 mm) is used.

Next, the value of MTF and the image quality of the image forming apparatus will be described.

Areas (dots) on photosensitive drum 41 of the image forming apparatus where toner is not to be attached should not be illuminated by LED head 3 and should have a sufficiently high potential in an electrostatic latent image. However, if the value of MTF is small, a part of the light emitted from LED head 3 may enter the areas that should be dark (should not be illuminated).

If the unwanted light enters the areas on photosensitive drum 41 that should not be illuminated and should have the sufficiently high potential, the potential of the areas decrease, resulting in unwanted adhesion of the toner to the areas.

Areas on paper where the toner is not to be attached by the image forming apparatus should be the same color as paper, e.g., white. However, areas on paper where the toner is not to be attached but is attached may be perceived as a mixture of the paper color, e.g., white and the toner color, thereby degrading the image printed by the image forming apparatus.

A variety of evaluations were performed and it was concluded that when MTF is equal to or greater than 80%, the printed image is free from white streaks and inconsistency in image density resulting in have high image quality.

Figure 13:
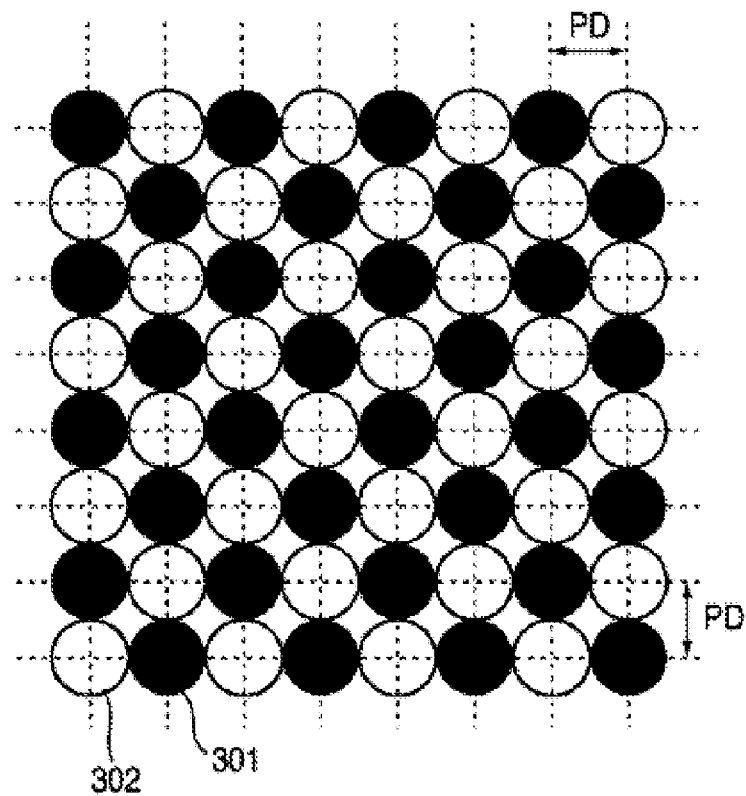
FIG. 13 is an explanatory view illustrating a print pattern used of the image forming apparatus for an evaluation test according to the first embodiment.

Next, evaluation was made on the images printed by a color LED printer that incorporates the lens unit of the first embodiment. High quality images free from white streaks and inconsistency in density were obtained. The evaluation of the image printed by the image forming apparatus is performed by evaluating the quality of the printed image where every other dot is printed in the entire printable area as shown in FIG. 13. In FIG. 13, reference numeral 301 represents dots (black in FIG. 13) where the toner is present while reference numeral 302 represents dots (white in FIG. 13) where the toner is absent. Pitch PD of dots is 0.0423 mm (PD= 0.0423 mm)

Note that microlens 12 of the first embodiment has a rotationally symmetric polynomial aspheric surface. The invention is not limited to this type of surface. The microlens may have a spherical surface. Yet alternatively, the microlens may have a curved surface such as an anamorphic aspheric surface, a parabolic surface, an elliptical surface, a hyperboloid, a conic surface, or the like.

Lens array 10 is formed by common injection molding in this embodiment, the lens array may be formed by compression injection molding method, machining method, or other methods. Also, the lens array may be formed of glass instead of resin.

Although shielding member 20 is molded from polycarbonate by injection molding in this embodiment, the shielding member may be made by machining, etching metal, or other methods.

The light source of the exposing unit of the first embodiment is an LED array in which plural LED elements 30 are aligned, the light source may also be an organic EL, a semiconductor laser, or the like.

As described above, the lens arrays according to the first embodiment are designed such that a ratio of distance SO1, which is a distance from object plane OP to first principal plane HF1, to distance SI1, which is a distance from second principal plane HS1 to intermediate image plane IMP, is equal to a ratio of distance SI2, which is a distance from intermediate image plane IMP to first principal plane HF2, to distance SO2, which is a distance from imaging plane IP to second principal plane HS2. Therefore, an optical system whose focal depth is large is obtained, thereby preventing forming of multiple decentralized (divided) images of the object even through the distance between imaging plane IP and microlens 12b provided on the imaging plane side varies.

Second Embodiment

The lens unit of the first embodiment has been described as being used in a printer serving as the image forming apparatus. The lens unit of a second embodiment will be described as being used a scanning apparatus (an image reading apparatus).

Figure 14:
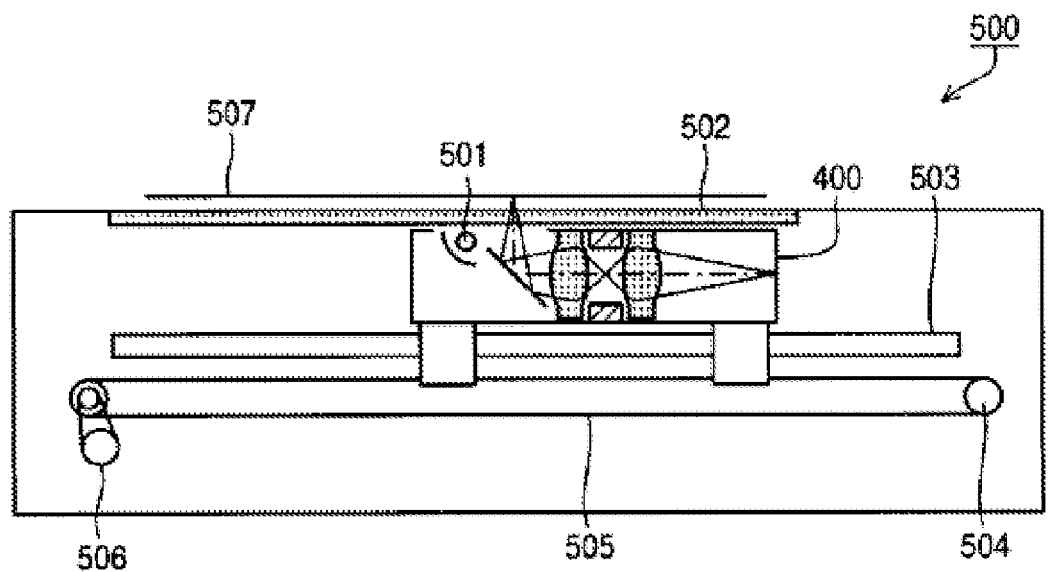
FIG. 14 is a diagrammatic view illustrating the configuration of a scanning apparatus according to a second embodiment.

The configuration of the second embodiment will be described with reference to FIG. 14 illustrating the general configuration of the scanning apparatus. Note that elements similar to those of the first embodiment are given the same reference numerals, and their description will be omitted.

Referring to FIG. 14, 500 represents a scanner or a scanning apparatus (image reading apparatus) configured to scan (read) original 507 and generate image data of original 507 in the form of electric data.

Scanner 500 includes scanning head 400, lamp 501, platen 502, rail 503, drive belt 505, motor 506, and the like.

Scanning head 400 is configured to illuminate the surface of original 507 by lamp 501 or an illumination device, receive the light reflected from the surface of original 507, and convert the received light into electric data or image data. Lamp 501 and scanning head 400 are disposed in such a manner that the light that is emitted from lamp 501 and reflected from the surface of original 507 enters into scanning head 400.

Platen 502 is formed of a transparent material, on which original 507 is disposed.

Rail 503 is provided under platen 502 and supports scanning head 400 such that scanning head 400 is movable on rail 503. Scanning head 400 is connected to drive belt 505 disposed about a plurality of pulleys 504, so that when the motor 506 drives drive belt 505 to run, scanning head 400 runs on rail 503 in a slidable manner.

Figure 15:
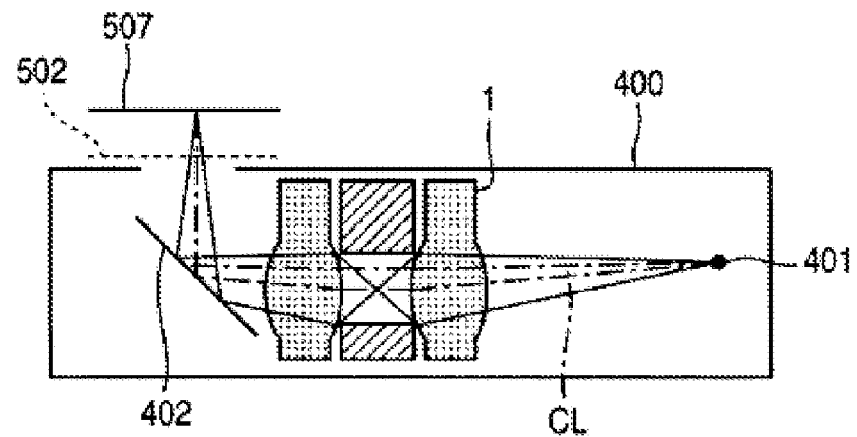
FIG. 15 is a diagrammatic view of the configuration of a scanning head of the scanning apparatus of the second embodiment.

Next, the configuration of scanning head 400 of the scanning apparatus of the second embodiment will be described with reference to FIG. 15 illustrating the general configuration of scanning head 400.

Referring to FIG. 15, scanning head 400 includes lens unit 1, line sensor 401, and mirror 402.

Mirror 402 bends the path of the light reflected by original 503 to guide the reflected light into lens unit 1.

Line sensor 401 includes a plurality of light receiving elements aligned in a straight line, and converts the image of the original formed by lens unit 1 into an electrical signal. Line sensor 401 is disposed on center line CL, which extends along the center of the width of lens unit 1.

Figure 16:
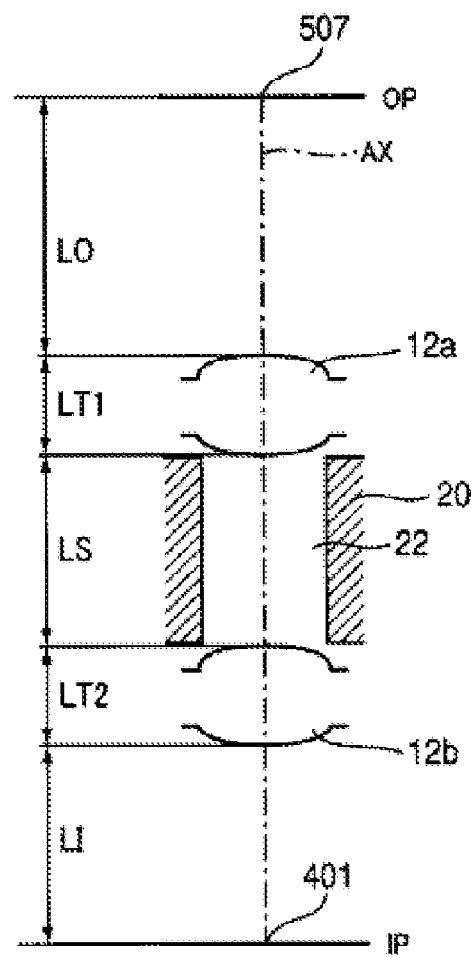
FIG. 16 is a diagrammatic view illustrating the operation of the scanning head of the scanning apparatus according to the second embodiment.

FIG. 16 illustrates the configuration of scanning head 400 of the second embodiment and the positional relationship between object plane OP (original 507) and imaging plane IP. Lens unit 1 of the second embodiment has the same configuration as the first embodiment. In lens unit 1, distance L0, which easily varies because of bent, deformation of original 507, is relatively larger than distance LI.

Line sensor 401 of the second embodiment has a resolution of 600 dpi, i.e., 600 light receiving elements are disposed per inch. In other words, the light receiving elements are disposed at 0.0423 mm pitch.

Next, the operation of the second embodiment having the aforementioned configuration will be described.

First, the operation of the image reading apparatus of the aforementioned configuration will be described with reference to FIG. 14.

When lamp 501 turns on to illuminate the surface of original 507, scanning head 400 receives the light reflected from original 507. Motor 506 drives drive belt 505, thereby causing scanning head 400 and lamp 501 to run in a left-to-right direction as viewed in FIG. 14, so that scanning head 400 can capture the entire image of original 507.

Next, the operation of scanning head 400 will be described with reference to FIG. 15.

The light reflected from original 507 passes through the transparent platen 502 and is then bent by the mirror 402 to enter into lens unit 1. Lens unit 1 forms the image of original 507 on line sensor 401, which in turn converts the image into electric signal to form electric data.

An experiment was conducted by using the scanning apparatus of the second embodiment. The resulting image data is good with as good resolution as original 507 shown in FIG. 13. Original has a resolution of 600 dpi. In other words, The original 507 contains every other dot of all dots spaced by pitch PD of 0.0423 mm.

Note that although the second embodiment has been described in terms of the scanner or the scanning apparatus that converts the image of an original into electric data, the invention may be applicable to sensors or switches that convert optical signals into electric signals and may be applicable to an input/output apparatus, biometric authentication apparatuses, communication devices, or dimension measuring devices that uses the sensors or the switches.

As described above, the scanning apparatus of the second embodiment achieves the same advantages to the first embodiment, providing image data having a sufficiently equal resolution even through the distance between the microlens on the object plane side and the object plane (the original) varies due to the deformation or bend of the original.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A lens unit comprising:
a lens array including plural lens pairs arrayed in at least one row along a direction orthogonal to axes of the lens pairs,
each of the lens pairs comprising:
a first lens configured to form an intermediate image, which is an inverted image of an object on an object plane, on an intermediate image plane; and
a second lens configured to form an image of the object, which is an inverted image of the intermediate image, on an image plane,
wherein the ratio of SO1 to SI1 is substantially the same as the ratio of SI2 to SO2, where SO1 is the distance between the first principal plane of the first lens and the object plane, SI1 is the distance between the second principal plane of the first lens and the intermediate image plane, SO2 is the distance between the first principal plane of the second lens and the intermediate image plane, and SI2 is the distance between the second principal plane of the second lens and the image plane, and
wherein the distance between the first lens and the object plane is different from the distance between the second lens and the image plane.

2. The lens unit according to claim 1, wherein the distance SO1 is different from the distance SO2.

3. The lens unit according to claim 1, wherein the ratio of LO1 to LI1 is substantially the same as the ratio of LI2 to LO2, where LO1 is the distance between the first lens and the object plane, LI1 is the distance between the first lens and the intermediate image plane, LO2 is the distance between the second lens and the intermediate image plane, and LI2 is the distance between the second lens and the image plane, and
the distance LO1 is different from the distance LI2.

4. The lens unit according to claim 3, wherein
The distance LI2 is greater than the distance LO1.

5. The lens unit according to claim 1, further comprising a shielding member having apertures, each aperture is provided between the first lens and the second lens, arrayed in a straight line, such that view fields of two adjacent lens pairs are overlapped with each other.

6. The lens unit according to claim 5, wherein the following formula (22) is satisfied:

$$\frac{P}{2} \leq RA\frac{SO-F}{F} \leq P \qquad [\text{Formula (22)}]$$

where P represents the pitch of the lens pairs along the array direction of the lens pairs, F represents the focal length of the first lens, SO represents the distance between the first principal plane of the first lens and the object plane, and RA represents the maximum value of the distance between the optical axis and the inner circumference of the aperture.

7. The lens unit according to claim 5, wherein the following formula (23) is satisfied:

$$\frac{P}{2} \leq RA\frac{LO-F}{F} \leq P \qquad [\text{Formula (23)}]$$

where P represents the pitch of the lens pairs along the array direction of the lens pairs, F represents the focal length of the first lens, LO represents the distance between the first lens and the object plane, and RA represents the maximum value of the distance between the optical axis and the inner circumference of the aperture.

8. The lens unit according to claim 5, wherein the following formula (24) is satisfied:

$$\frac{P}{2} \leq RA\frac{SO}{SI} \leq P \qquad [\text{Formula (24)}]$$

where P represents the pitch of the lens pairs along the array direction of the lens pairs, SO represents the distance between the first principal plane of the first lens and the object plane, SI represents the distance between the second principal plane of the first lens and the intermediate image plane, and RA represents the maximum value of the distance between the optical axis and the inner circumference of the aperture.

9. The lens unit according to claim 5, wherein the following formula (25) is satisfied:

$$\frac{P}{2} \leq RA\frac{LO}{LI} \leq P \qquad [\text{Formula (25)}]$$

where P represents the pitch of the lens pairs along the array direction of the lens pairs, LO represents the distance between the first lens and the object plane, LI represents the distance between the first lens and the intermediate image plane, and RA represents the maximum value of the distance between the optical axis and the inner circumference of the aperture.

10. The lens unit according to claim 5, wherein
the lens pairs are arrayed in two rows along the direction orthogonal to the axes of the lens pairs, and
the following formula (26) is satisfied:

$$\sqrt{\left(\frac{PX}{2}\right)^2 + \left(\frac{PY}{4}\right)^2} \leq RA\frac{SO-F}{F} \leq \sqrt{\left(\frac{PX}{2}\right)^2 + \left(\frac{PY}{2}\right)^2} \qquad [\text{Formula (26)}]$$

where PY represents the pitch of the lens pairs in the array direction of the lens pairs, PX represents the pitch of the lens pairs in the direction orthogonal to the array direction of the lens pairs, F represents the focal length of the first lens, SO represents the distance between the first principal plane of the first lens and the object plane, and RA represents the maximum value of the distance between the optical axis and the inner circumference of the aperture.

11. The lens unit according to claim 5, wherein
the lens pairs are arrayed in two rows along the direction orthogonal to the axes of the lens pairs, and
the following formula (27) is satisfied:

$$\sqrt{\left(\frac{PX}{2}\right)^2 + \left(\frac{PY}{4}\right)^2} \leq RA\frac{LO-F}{F} \leq \sqrt{\left(\frac{PX}{2}\right)^2 + \left(\frac{PY}{2}\right)^2} \qquad [\text{Formula (27)}]$$

where PY represents the pitch of the lens pairs in the array direction of the lens pairs, PX represents the pitch of the lens pairs in a direction orthogonal to the array direction of the lens pairs, F represents the focal length of the first lens, LO represents the distance between the first lens and the object plane, and RA represents the maximum value of the distance between the optical axis and the inner circumference of the aperture.

12. The lens unit according to claim 5, wherein
the lens pairs are arrayed in two rows along the direction orthogonal to the axes of the lens pairs, and
the following formula (28) is satisfied:

$$\sqrt{\left(\frac{PX}{2}\right)^2 + \left(\frac{PY}{4}\right)^2} \leq RA\frac{SO}{SI} \leq \sqrt{\left(\frac{PX}{2}\right)^2 + \left(\frac{PY}{2}\right)^2} \quad \text{[Formula (28)]}$$

where PY represents the pitch of the lens pairs in the array direction of the lens pairs, PX represents the pitch of the lens pairs in a direction orthogonal to the array direction of the lens pairs, SO represents the distance between the first principal plane of the first lens and the object plane, SI represents the distance between the second principal plane of the first lens and the intermediate image plane, and RA represents the maximum value of the distance between the optical axis and the inner circumference of the aperture.

13. The lens unit according to claim 5, wherein
the lens pairs are arrayed in two rows along the direction orthogonal to the axes of the lens pairs, and
the following formula (29) is satisfied:

$$\sqrt{\left(\frac{PX}{2}\right)^2 + \left(\frac{PY}{4}\right)^2} \leq RA\frac{LO}{LI} \leq \sqrt{\left(\frac{PX}{2}\right)^2 + \left(\frac{PY}{2}\right)^2} \quad \text{[Formula (29)]}$$

where PY represents the pitch of the lens pairs in the array direction of the lens pairs, PX represents the pitch of the lens pairs in the direction orthogonal to the array direction of the lens pairs, LO represents the distance between the first lens and the object plane, LI represents the distance between the first lens and the intermediate image plane, and RA represents the maximum value of the distance between the optical axis and the inner circumference of the aperture.

14. The lens unit according to claim 1, wherein
the distance between the first lens and the object plane is less than the distance between the second lens and the image plane.

15. An LED head comprising the lens unit according to claim 1.

16. An exposing unit comprising the lens unit according to claim 1.

17. An image forming apparatus comprising a lens unit according to claim 1.

18. A scanning apparatus comprising the lens unit according to claim 1.

19. The lens unit according to claim 1, wherein
the distance between the first lens and the object plane is greater than the distance between the second lens and the imaging plane.

20. A scanning apparatus comprising the lens unit according to claim 19.

* * * * *